United States Patent [19]

Stehle et al.

[11] 3,714,105
[45] Jan. 30, 1973

[54] ADHESIVE LATEXES OF VINYL ACETATE/ETHYLENE/N-METHYLOLACRYLAMIDE TERPOLYMERS

[75] Inventors: Peter Fallon Stehle, Media; Chan K. Wu, Levittown, both of Pa.; Samuel Loshaek, Stamford, Conn.; Jack Dickstein, Huntington Valley, Pa.

[73] Assignee: Borden Inc., New York, N.Y.

[22] Filed: Feb. 8, 1971

[21] Appl. No.: 113,766

Related U.S. Application Data

[63] Continuation-in-part of Ser. No. 874,410, Nov. 5, 1969, Pat. No. 3,644,262.

[52] U.S. Cl. ...260/29.6 WA, 260/17 A, 260/17.4 ST, 260/29.6 WB, 260/29.6 TA
[51] Int. Cl. ..........................C08f 45/22, C08f 1/13
[58] Field of Search............260/29.6 TA, 29.6 WA, 29.6 WB

[56] References Cited

UNITED STATES PATENTS

| | | | |
|---|---|---|---|
| 3,345,318 | 10/1967 | Lindemann et al. | 260/29.6 TA |
| 3,423,352 | 1/1969 | Levine et al. | 260/29.67 A |
| 3,553,116 | 1/1972 | Kaplan et al. | 260/29.6 TA |
| 3,644,262 | 2/1972 | Stehle et al. | 260/29.6 R |

*Primary Examiner*—William H. Short
*Assistant Examiner*—L. M. Phynes
*Attorney*—George P. Maskas and George A. Kap

[57] ABSTRACT

Latex adhesives with excellent resistance to cold flow and peel are prepared by a method comprising (a) maintaining about 50–300 psi ethylene pressure on an aqueous emulsifying composition containing a partially hydrolyzed polyvinyl alcohol and a free-radical donor selected from alkali metal and ammonium persulfates and peroxydiphosphates, (b) causing said free-radical donor to initiate interpolymerization while (c) gradually adding vinyl acetate (VAc) and N-methylol acrylamide (NMA) monomers in substantially constant NMA/VAc weight ratio of about 0.5 to 2.0 percent, wherein said polyvinyl alcohol and free-radical donor are used in amounts respectively of about 2.5–8.0 percent and 0.5–2 percent based on the total weight of vinyl acetate used and wherein the rates of monomer addition are sufficient to cause interpolymerization of the vinyl acetate, ethylene and NMA, but insufficient to permit the quantity of unpolymerized vinyl acetate in the aqueous composition to rise higher than about 3.5 percent by weight of the composition during the preparation of at least 75 percent of said interpolymerization.

5 Claims, No Drawings

ADHESIVE LATEXES OF VINYL ACETATE/ETHYLENE/N-METHYLOLACRYLAMIDE TERPOLYMERS

BACKGROUND OF THE INVENTION

This application is a continuation-in-part of application Ser. No. 874,410 filed Nov. 5, 1969 now U.S. Pat. No. 3,644,262, granted Feb. 22, 1972.

Latexes of vinyl acetate/ethylene copolymers having a weight ratio of vinyl acetate to ethylene equal to about 92/8 to 85/15 are particularly suitable as adhesives providing excellent adhesive strength in the bonding, for example, of porous substrates like wood, cloth or paper to each other and to non-porous substrates such as films of polyvinyl chloride (vinyl film) and of polyolefins like polyethylene and polypropylene.

Said earlier application, of which the present application is a continuation-in-part, discloses a method for obtaining vinyl acetate/ethylene copolymers in the desirable 92/8 – 85/15 range using ethylene pressures of only about 50 – 300 psi. Such copolymers, however, tend in a moderate degree to have a deficiency which is characteristic of thermoplastic adhesives in general, namely they are somewhat prone to exhibit "cold flow" when subjected for long periods of time to a static stress less than is required to cause immediate adhesive failure.

"Cold flow" is a gradual displacement, elongation or positional shift of adhesive interlayer in a joint or laminate, which can ultimately lead to bond failure. In accordance with common custom, the term "cold flow" is used herein to designate any such displacement or elongation not only at temperatures which are ordinarily recognized as "cold" but at any temperature at which said displacement can take place.

Adhesives which exhibit "cold flow" also tend to have a low resistance to peeling. In practice, laminated structures are often subjected to stresses tending to peel the layers apart, and it is desirable to have improved resistance to such stresses.

As the temperature of a thermoplastic adhesive bond is raised, both "cold flow" and peeling tendency are increased. Since many uses of bonded structures involve their exposure to elevated temperatures, it is also desirable to have adhesives with improved resistance to "cold flow" and peel at elevated as well as ordinary temperatures.

SUMMARY OF THE INVENTION

A method has now been found, using only about 50 – 300 psi ethylene pressure, whereby interpolymer latexes based on vinyl acetate and ethylene can be made which not only are excellent adhesives, but also have excellent resistance to "cold flow" and peel at elevated as well as ordinary temperatures.

The interpolymers of this invention contain from about 0.5 to 2.0 percent of N-methylolacrylamide polymerized therein, but this alone is not sufficient to effect the improvements in resistance to "cold flow" and peel. As elucidated hereinafter, the method has further restrictions as to the manner of using polyvinyl alcohol and initiator and uses the polymerization procedure of the parent application.

The method of this invention comprises (a) maintaining ethylene pressure at a level in the range from about 50 to about 300 psi on an aqueous emulsifying composition at about between 0° and 70° C., said composition containing a partially hydrolyzed polyvinyl alcohol and a free-radical donor selected from alkali metal and ammonium persulfates and peroxydiphosphates, (b) causing said free-radical donor to initiate interpolymerization while (c) gradually adding vinyl acetate (VAc) and N-methylolacrylamide (NMA) in substantially constant NMA/VAc weight ratio at about from 0.5 to 2.0 percent, wherein said polyvinyl alcohol and free-radical donor are used in amounts respectively of about from 2.5 to 8 percent and about from 0.5 to 2.0 percent based on the total weight of vinyl acetate used and wherein the rates of monomer addition are sufficient to cause interpolymerization of the vinyl acetate, ethylene and NMA, but insufficient to permit the quantity of unpolymerized vinyl acetate in the aqueous composition to rise higher than about 3.5 percent by weight of the composition during the preparation of at least 75 percent of said interpolymerization.

DETAILED DESCRIPTION

The present invention as above described incorporates a procedure described in the above-cited pending application of which the instant application is a continuation-in-part. This procedure limits the amount of the unpolymerized vinyl acetate monomer present in the aqueous composition during interpolymerization, thereby obtaining the copolymerization of larger proportions of ethylene than has heretofore been obtained at equivalent temperature and pressure.

Moreover, the method as above described contains three additional conditions all of which are required in order to obtain the special advantages of the instant invention in providing a product with not only high adhesive strength but also high resistance to "cold flow." These conditions are:

CONDITION I: Before polymerization is commenced, the aqueous emulsifying composition comprises a partially hydrolyzed polyvinyl alcohol in amount corresponding to about from 2.5 to 8 percent of the total weight of vinyl acetate monomer used.

CONDITION II: The aqueous composition comprises as the oxidant, free-radical donating part of the initiating system, an alkali-metal or ammonium persulfate or peroxydiphosphate in amounts corresponding to about from 0.5 to 2.0 percent of the total weight of vinyl acetate monomer used.

CONDITION III: N-methylolacrylamide (NMA) is interpolymerized in the amount of about from 0.5 to 2.0 percent based on the total weight of vinyl acetate monomer used and this interpolymerization is effected by adding the NMA gradually and simultaneously with the vinyl acetate.

When any one of these three conditions is omitted, the advantages of high resistance to "cold flow" and peel are lost. These advantages are surprisingly gained as the synergistic effect of all three conditions operating together.

In carrying out the method of this invention, an aqueous emulsifying composition is first prepared comprising the partially hydrolyzed polyvinyl alcohol and the free-radical donor.

According to a preferred variation, the emulsifying composition contains also a seed latex, to be described in detail below. The reactor is then pressurized with ethylene to the desired pressure and brought to the desired temperature.

The condition for initiation of polymerization, i.e., the establishment of a sufficient level of free-radicals, is achieved either by using a temperature sufficiently high to cause the free-radical donor to undergo thermal scission (as for example in the range of about 60°–70° C) or preferably, by the addition of a reducing agent, using the well-known "redox" procedure. In either case, it is preferred to withold the addition of vinyl acetate and N-methylolacrylamide monomers until an effective level of initiator free-radicals is established. Thus, in a thermally initiated system, the temperature is preferably first raised to cause the production of free-radicals before addition of vinyl acetate and N-methylolacrylamide is commenced. Likewise, when a redox system is used, it is preferred to start addition of the reducing agent prior to, or at least simultaneously with the commencement of vinyl acetate and N-methylolacrylamide addition.

Vinyl acetate (VAc) and N-methylolacrylamide (NMA) are then added gradually (either continuously or in small increments) to the ethylene-pressurized aqueous composition in substantially constant VAc/N-MA ratio over an extended period of time to effect interpolymerization of vinyl acetate, ethylene and NMA. The rates of the additions are carefully controlled so as to keep the level of unreacted vinyl acetate monomer in the aqueous composition below a threshold of at most about 3.5 percent and preferably below a threshold of about 1% based on weight of the aqueous composition.

When the rates of addition are controlled in this manner, ethylene pressures can be used in the range of from about 50 to 300 psi at about 0° to 70°C. to make interpolymers having a VAc/ethylene weight ratio in the range of about 92/8 to 85/15. On the other hand, if the addition rates are not controlled as described and the free vinyl acetate monomer is allowed to build up above about 3.5 percent in the aqueous composition, substantially lower amounts of ethylene are interpolymerized at a given pressure.

While some of the advantages of this invention can be obtained over a wide range of pressures and temperatures, it is preferred to use, as adhesives, interpolymers in which the VAc/ethylene weight ratio ranges from about 92/8 to 85/15 and it is therefore preferred to make these using ethylene pressure selected from the range of about 50 to 300 psi at temperatures selected from the range from about 0° to 70°C. More particularly suitable conditions are pressures from about 140 to 160 psi and temperatures between about 20° and 35°C. which can yield VAc/ethylene ratios between about 91/9 and 87/13 when the addition rates are controlled as above described.

Some of the advantages of this invention can be obtained if only part of the polymerization is carried out with the described limitation of free vinyl acetate monomer. Thus, for example, when a seed of vinyl acetate/ethylene copolymer is first formed "in situ" as hereinafter described, the aqueous composition can initially contain a concentration of vinyl acetate monomer higher than about 3.5 percent. However, at least about 75 percent of the polymer made in method of this invention is made with the stated limitation of vinyl acetate free monomer and it is preferred to have such limitation during at least 90 percent of the duration of interpolymerization.

The polyvinyl alcohol in this invention can be used in amount corresponding to about 2.5 to 8 percent on the weight of the total vinyl acetate used, preferably, between about 4 and 6 percent. Any partially hydrolyzed grade of polyvinyl alcohol can be used in which the degree of ester hydrolysis is between about 80 and 92 percent, preferably between about 85 and 88 percent. When all the other conditions of this invention are satisfied, stable latexes of similarly composed vinyl acetate/ethylene/N-methylolacrylamide terpolymers can be obtained using fully hydrolyzed polyvinyl alcohols, but the partially hydrolyzed polyvinyl alcohols are preferred.

The polyvinyl alcohol as used in this invention must be added initially to the emulsifying composition; if the polyvinyl alcohol is added gradually and simultaneously with the vinyl acetate and N-methylolacrylamide, the advantages in adhesive properties characteristic of the product of this invention are not obtained.

The free-radical donating initiator selected from the alkali metal and ammonium persulfates and peroxydiphosphates can exemplarily be potassium persulfate, sodium persulfate, ammonium persulfate, potassium peroxydiphosphate, sodium peroxydiphosphate or ammonium peroxydiphosphate and mixtures thereof, and can be used in an amount in the range of about 0.5 to 2.0 percent based on the total weight of vinyl acetate monomer used, an amount between about 0.7 and 1.5 percent being preferred.

When a reducing agent is used to activate the free-radical donor, this can be any of such agents known to the art, such as sodium formaldehyde sulfoxylate, sodium metabisulfite, sodium hydrosulfite, ascorbic acid, ferrous salts and tertiary aromatic compounds such as N, N-dimethylaniline. The reducing agent is added gradually during the polymerization stage, preferably as an aqueous solution in an amount which will depend on pH and other factors understood by those trained in the art of emulsion polymerization. Such amount of reducing agent is approximately from between 0.2 to 1.0 times the weight of free-radical donor used. The weight ratio of 0.2 to 0.75 of reductant to oxidant is preferred.

A preferred variation in preparing the latex of this invention is to carry out the interpolymerization in the presence of a seed latex. Such seed latex is preferably a vinyl acetate/ethylene copolymer latex. The seed latex can be prepared "in situ" as illustrated in the procedure of Example 1, of this specification. Alternatively, the seed latex can be prepared beforehand in a separate reactor, as for example, a vinyl acetate ethylene copolymer latex containing from about 40 to about 60 percent solids; and an aliquot of such separately prepared latex can be added to the aqueous emulsifying composition in amount so as to constitute between about 5 and about 25 percent of the total polymer to be obtained in the final product of the method of this invention.

The polyvinyl alcohol which is used in this invention as one of the synergistic factors contributing to improved adhesive properties, also serves as a stabilizing agent during both the interpolymerization and post-polymerization stages. However, there can also be used therewith any of the surfactants customarily used in emulsion polymerization. Such surfactants can be used in amounts between about 0.0 and 5.0 percent based on the weight of the aqueous emulsifying composition. It is preferred not to use such surfactants in excess of 1 percent based on said composition.

When surfactants are used, non-ionic and anionic types are preferred. In particular, there can be mentioned sodium lauryl sulfate, nonylphenoxy poly (ethylene oxy) ethanols such as the Igepals, including the full range of ethylene oxide contents available and designated commercially by various numbers ranging from CO 530 to CO 890. Also effective are sulfosuccinates such as Aerosol OT; the sodium and ammonium salts of sulfate esters of alkylphenoxy poly (ethyleneoxy) ethanols such as the commercially available Alipal CO–433 and Alipal CO–436; and condensates of ethylene oxide with hydrophobic bases formed by condensing propylene oxide with propylene glycol such as are available under the proprietary name Pluronics.

The synergistic importance of all three conditions I, II, and III of this invention is illustrated in the examples below, as summarized in Table I. The procedure used in all these examples fulfilled the further condition of this invention restricting the vinyl acetate monomer level to no higher than 3.5 percent by weight of the aqueous emulsifying condition. The tests used in evaluating adhesive strength, "cold flow" and peel rate were carried out as follows:

Test A: Adhesive strength is measured as the average force required to peel a standard laminate of cotton cloth and vinyl film laminated with the adhesive. The greater this force, the greater is the adhesive strength.

The latex was cast on a commercially available vinyl film (Resinite K6) using a Gardner knife at 15 mils aperture. A swatch of unsized cotton cloth (Test Fabrics, Inc. standard 80×80 bleached cloth, style 400W) was then placed on the wet film and lightly smoothed to give bubble-free lamination. The laminate was air dried and cut into one-inch wide strips. The vinyl film was peeled from the cloth in a Tinius-Olsen universal testing machine, the rate of separating the grips being 2 inches per minute. The average force in lbs. required over a 5 inch length of vinyl film is taken as a measure of the adhesive strength. Examination of the separated layers shows that failure usually occurs between the adhesive and the vinyl substrate. Commercially acceptable latex adhesives in general give values between about from 4 to 6.5 lbs.

Test B: Resistance to "cold flow" is measured as the threshold temperature required to cause separation of a cloth lap joint made with the adhesive and suspended under a standard force. The higher this temperature, the greater the cold flow resistance.

A lap joint between pieces of the standard unsized cotton cloth described in Test A was prepared applying a 30 mil film of wet latex. The lap joint was 0.25 sq. in. (0.5 × 0.5 in.) in area. The specimen was air dried and then suspended in an oven and weighted with a 1,000 gram weight. The temperature was slowly raised at a rate of 0.75° Fahrenheit per hour, failure was recorded at the temperature at which the lap joint separated. The test was discontinued if the sample had not failed at 370°F.

Test C: Peel was measured as the rate at which two strips of cloth laminated with the adhesive were separated under a 500 gram pull at 65°C. The larger this standard peel rate, the poorer the peel resistance.

Two pieces of the standard unsized cotton cloth were laminated with a 30 mil wet film of the latex. The film was applied to one piece of cloth using a Gardner knife, the other piece of cloth was then placed on the wet film and lightly smoothed to give bubble-free lamination. The laminate was air dried and cut into strips 1 inch wide. At one end of each strip, one of the two laminated cloth pieces was suspended in an oven held at 65°C. The opposite cloth piece was weighted with a 500 gram weight. The rate of separation was recorded.

TABLE I

Effect of Using Conditions I, II and III on Adhesive Properties

| Example | Conditions of this invention | | | A Cloth/vinyl adhesive strength, lbs. | B "cold flow" resistance, F° | C Peel rate, mm./hr. |
|---|---|---|---|---|---|---|
| | I | II | III | | | |
| 1 | + | + | + | 6.7 | >370° | 14 |
| 2 | + | + | + | 5.1 | >370° | 16 |
| 3 | + | + | + | 5.4 | >370° | 12 |
| 4 | + | + | + | 6.4 | >370° | 14 |
| 5 | − | − | − | 5.7 | 198° | 98 |
| 6 | − | + | − | 6.8 | 203° | |
| 7 | − | − | + | 5.1 | 212° | 112 |
| 8 | + | − | − | 4.4 | 198° | 93 |
| 9 | − | + | + | 6.2 | 189° | 200 |
| 10 | + | − | + | 4.5 | 217° | 144 |
| 11 | − | + | − | 4.7 | 282° | 100 |

In the examples, the proportions are expressed in parts by weight unless stated otherwise. The values reported for the ethylene content of the resultant polymers were obtained by direct quantitative elemental analysis.

Examples 1, 2, 3 and 4 show procedures in which all three conditions I, II, and III of the instant invention were fulfilled. Examples 5 through 11, on the other hand, are not examples of this invention, but instead illustrate the results when one, two or all three of these conditions were not fulfilled. In Table I, the fulfillment of a condition is indicated by a plus (+) sign and the non-fulfillment of a condition is indicated by a minus (−) sign.

The data in Table I show that fulfillment of all three conditions of this invention resulted in not only good adhesive strength but also excellent resistance to "cold flow" and peel. On the other hand, in the examples where either one, two or all three of the conditions of the method were not fulfilled, the "cold flow" resistance was substantially lower and the rate of peel was likewise unsatisfactory, being substantially higher by a factor of between 5 and 15 times as great. It is indeed surprising that the three conditions which collectively give such marked improvement have little or no effect when used singly or in pairs.

EXAMPLE 1

This example illustrates a procedure in which all three conditions I, II, and III of the method of this invention are included. About 10 percent of the vinyl acetate used in this preparation was used to make an "in situ" seed.

A glass lined reactor provided with a propeller agitator and heat exchange jacket was charged with 38.0 parts by weight of deionized water and 2.5 parts of a grade of polyvinyl alcohol whose degree of hydrolysis was 88–89 percent and whose viscosity in 4 percent aqueous solution at 20°C. was 5. centipoises. After solution was complete, there was added 0.2 parts sodium bicarbonate, 0.5 parts potassium persulfate and 5.0 parts of vinyl acetate monomer. The quantity of potassium persulfate corresponded to 1.0 percent by weight based on the weight of total vinyl acetate used. The reactor and solution were purged of air and the temperature was raised to 25°C. The reactor was then pressurized with 150 psi of ethylene and maintained at this pressure throughout the polymerization stages of this preparation.

A solution A was prepared containing 0.15 part by weight sodium formaldehyde sulfoxylate in 2.8 parts deionized water. Immediately upon admission of ethylene, polymerization was initiated by the addition of an increment of solution A corresponding to 0.01 part of sodium formaldehyde sulfoxylate. Additional such increments were added at 5-minute intervals over a period of 30 minutes. During this time, the temperature of the aqueous composition rose to 30°C. from the heat of polymerization and the temperature was held at 30°C±1°C. during the remaining stages of this preparation by means of cooling through the heat-exchange jacket. One hour was allowed to attain substantially complete polymerization of the seed. Then two gradual and simultaneous feeds were made to the reactor over a period of eight hours. These feeds consisted of 44.6 part of vinyl acetate monomer and respectively a solution of 0.45 parts of N-methylolacrylamide in 5.9 parts of deionized water. Over the same period the remaining solution A was added in aliquot increments every 5 minutes. At approximately twenty minute intervals throughout the addition period, small samples of the liquid (latex) composition were removed from the reactor through a cold pressure trap to which polymerization-inhibiting hydroquinone had been added. The samples were sufficiently small so that the changes in overall composition of the aqueous composition were negligible. The free-vinyl acetate monomer was determined by quantitative distillation from a weighed portion of each sample, this method having been standardized by a procedure of direct bromine titration. The data obtained showed that free vinyl acetate monomer was in every case less than 1 percent by weight of the latex sample.

The finished latex had a solids content equal to 55.2 percent and the residual vinyl acetate monomer was 0.2 percent ethylene content was 9.6 percent and stability was excellent. Viscosity of the latex was 1,300 cps. as measured with a Brookfield viscometer with No. 4 spindle at 60 rpm.

Adhesion for this latex was found to be 6.7 lbs. elevated temperature "cold flow" resistance greater than 370°F., and peeling rate was 14 m.m./hr.

EXAMPLE 2

This example illustrates an alternate modification of the polymerization procedure according to the instant invention which omits the prior formation of a seed. In addition, the potassium persulfate added initially to the aqueous composition was 0.65 parts, corresponding to a level of 1.3 percent of the weight of total vinyl acetate used. All the vinyl acetate, totalling 49.6 parts was added gradually, at a substantially constant rate requiring 10.5 hours for complete addition. Initiation of polymerization was effected by addition of the first increment of sodium formaldehyde sulfoxylate simultaneously with commencement of vinyl acetate addition. Incremental addition totalling 0.035 parts of sodium formaldehyde sulfoxylate were made during 30 minutes. Thereafter, the polymerization was carried out as described in Example 1. Periodic sampling showed that free VAc monomer was maintained under 1 percent of the latex composition.

The resultant latex had a solids content equal to 59.4 percent and the residual vinyl acetate monomer was equal to 0.5 percent. Viscosity of the latex was 3,000 cps. Elemental analysis of the recovered polymer showed the ethylene content to be 10.5 percent by weight of said polymer.

Performance tests of the latex of this example which include all conditions I, II, III of the method of this invention showed an adhesive strength of 5.1 lbs. "cold flow" resistance of greater than 370°F. and a desirably low peel equal to 16 mm/hr.

EXAMPLE 3

This example illustrates a variation in carrying out the method of this invention including a small quantity of surfactant.

A latex was prepared using substantially the same procedure as in Example 1, except that 0.125 parts of sodium lauryl sulfate was included in the initial charge. Vinyl acetate monomer was at a level of 1 percent or less throughout the polymerization.

The resultant latex had a solids content equal to 56.4 percent and the residual vinyl acetate monomer was less than 0.1 percent. Viscosity of the latex was 1,800 cps. Elemental analysis of the recovered polymer showed the ethylene content to be 10.2 percent by weight of said polymer.

Performance tests of the latex of this example showed an adhesive strength of 5.4 lbs. a "cold flow" resistance of greater than 370°F. and a peel of 12 mm./hr., typical of results with the method of the instant invention. This example also substantiates that the inferior properties observed in Examples 5, 6, 7 and 9 are not attributable to the presence of the small amounts of sodium lauryl sulfate included in the initial charge, but are the result of the absence of one or more of the conditions I, II, and III.

EXAMPLE 4

A latex was prepared using substantially the same procedure as in Example 1, except that the potassium persulfate was replaced by an equal amount of ammonium persulfate and, in addition, 0.25 parts of sodium vinyl sulfonate was added to the aqueous, solution containing N-methylolacrylamide. Vinyl acetate monomer was at a level of 1 percent or less throughout the polymerization.

The resultant latex had a solids content equal to 57.5 percent and the residual vinyl acetate monomer was equal to 0.5 percent. Viscosity of the latex was 1,300 cps. Elemental analysis of the recovered polymer showed the ethylene content to be 11.3 percent by weight of said polymer.

Performance tests of the latex of this example showed an adhesive strength of 6.4 lbs., a "cold flow" resistance equal to greater than 370°F and the peel was 14 mm/hr. This example followed all the conditions I, II, & III of the method of this invention and the properties of the product latex were characteristically superior.

EXAMPLE 5

A latex was prepared using substantially the same procedure as in Example 3, except that none of the three special conditions characteristic of this invention were included, namely (1) the polyvinyl alcohol was not added in the initial charge, but was added gradually during the course of polymerization, (2) the potassium persulfate was reduced in amount to 0.15 parts corresponding to about 0.3 percent on the weight of total vinyl acetate used and (3) no N-methylolacrylamide was used. Vinyl acetate monomer was at a level of 1 percent or less throughout the polymerization.

The resultant latex had a solids content equal to 56.0 percent and the residual vinyl acetate monomer was less than 0.1 percent. Viscosity of the latex was 1,500 cps. Elemental analysis of the recovered polymer showed the ethylene content to be 10.7 percent by weight of said polymer.

Performance tests of the latex of this example showed a good adhesive strength of 5.7 lbs. but the "cold flow" resistance was only 198°F., and peel was 98 mm/hr. Both values are markedly inferior to those obtained when the three required conditions are fulfilled.

EXAMPLE 6

A latex was made by the procedure of Example 5 except that potassium persulfate was increased to a level characteristic of the instant invention, namely, 0.5 parts, corresponding to 1.0 percent initiator on the weight of total vinyl acetate used, and condition II was met. Vinyl acetate monomer was at a level of 1 percent or less throughout the polymerization but Condition I and III were not fulfilled.

The resultant latex had a solids content equal to 54.8 percent and a residual vinyl acetate monomer content of less than 0.1 percent. Viscosity of the latex was 3,000 cps. Elemental analysis of the recovered polymer showed the ethylene content to be 11.8 percent by weight of said polymer. Performance tests showed an adhesive strength of 6.8 lbs., but "cold flow" resistance was only 203°F. showing inferiority as compared to the product of Examples 1-4, where all the features of the method of the instant invention were used.

EXAMPLE 7

A latex was prepared according to the procedure of Example 5 except that N-methylolacrylamide was added as in Example 1, at the level of 0.45 parts corresponding to 0.9 percent on the weight of total vinyl acetate used. Thus, of the three conditions required by the instant invention, only condition III was met. Throughout the polymerization unreacted vinyl acetate monomer was at a level of 1 percent or less based on the weight of the emulsifying composition.

The resultant latex had a solids content equal to 58.7 percent and the residual vinyl acetate monomer was 0.2 percent. The viscosity of the latex was 4,000 cps. Elemental analysis of the recovered polymer showed the ethylene content to be 10.9 percent by weight of said polymer. Performance tests of this latex showed an adhesive strength of 5.1 lbs., an inferior "cold flow" resistance of 212°F. and an inferior peel of 112 mm./hr.

EXAMPLE 8

A latex was made by the procedure of Example 5, except that the polyvinyl alcohol was added initially as in Example 1, according to the instant invention. Also as in Example 1, no sodium lauryl sulfate was used. Vinyl acetate monomer was at a level of 1 percent or less throughout the polymerization. The resultant latex had a solids content equal to 59.2 percent and a residual vinyl acetate monomer content equal to 0.4 percent. Viscosity of the latex was 1,700 cps. Elemental analysis of the recovered polymer showed the ethylene content to be 10.0 percent by weight of said polymer. The procedure of this example omitted conditions II and III of this invention. Adhesive tests showed an adhesive strength of 4.4 lbs., a "cold flow" resistance of only 198°F., and a poor (high) peel, 93mm./hr., again showing inferiority as compared to the product of Examples 1-4, where all the features of the method of the instant invention were incorporated.

EXAMPLE 9

This example illustrates a procedure in which conditions II and III were included, but condition I was omitted. A latex was prepared using substantially the same procedure as in Example 3, except that the polyvinyl alcohol was added gradually during the course of polymerization. Vinyl acetate monomer was at a level of 1 percent or less throughout the polymerization.

The resultant latex had a solids content equal to 61.7 percent and the residual vinyl acetate monomer was equal to 0.4 percent. Viscosity of the latex was 1,700 cps. Elemental analysis of the recovered polymer showed the ethylene content to be 12.6 percent by weight of said polymer.

Performance tests of the latex of this example, which is not an example of the method of the instant invention, showed an adhesive strength equal to 6.2 lbs., "cold flow" resistance of only 189°F., and a poor peel of 200 mm/hr. This example shows that inferior properties result when condition I characteristic of the method of this invention is omitted, even when conditions II and III are met.

EXAMPLE 10

A latex was prepared using substantially the same procedure as in Example 1, except that the potassium persulfate was reduced in amount to 0.17 parts, corresponding to a level of 0.34 percent on the weight of the emulsifying composition. Thus, while conditions I and III of the method were met, condition II was not satisfied. Vinyl acetate monomer was at a level of 1 percent or less throughout the polymerization.

The resultant latex had a solids content equal to 58.4 percent and the residual vinyl acetate monomer was equal to 0.2 percent. Viscosity of the latex was 1,700 cps. Elemental analysis of the recovered polymer showed the ethylene content to be 10.0 percent by weight of said polymer.

Adhesive tests of the latex of this example, which is not an example of the method of instant invention, showed an adhesive strength of 4.5 lbs., "cold flow" resistance of 217°F. and a poor (high) rate of 144 mm/hr.

EXAMPLE 11

A latex was prepared using substantially the same procedure as in Example 1, except that no N-methylolacrylamide was used, thus omitting condition III required in the instant invention. Unreacted vinyl acetate monomer was at a level of 1 percent or less throughout the polymerization.

The resultant latex had a solids content equal to 59.3 percent and the residual vinyl acetate monomer was equal to 0.3 percent. Viscosity of the latex was 2,100 cps. Elemental analysis of the recovered polymer showed the ethylene content to be 11.8 percent by weight of said polymer.

Adhesion tests of the latex of this example, which is not an example of the method of instant invention, omitting as it does condition III, showed an adhesive strength of 4.7 lbs. but the "cold flow" resistance was only 282°F. and the peel was 100 mm/hr.

It will be understood that it is intended to cover all changes and modifications of the examples of the invention herein chosen for the purpose of illustration which do not constitute departures from the spirit and scope of the invention.

What is claimed is:

1. A process of preparing a latex adhesive of an interpolymer of the monomers vinyl acetate, ethylene and N-methylolacrylamide, said adhesive having excellent resistance to "cold flow" and "peel," said process comprising the successive steps of a. dispersing in water, in the absence of vinylacetate and N-methylolacrylamide, about from 2.5 to 8.0 parts by weight of a partially hydrolyzed polyvinyl alcohol, b. adding to the polyvinyl alcohol dispersion about from 0.5 to 2.0 parts of a free-radical donor selected from the group consisting of the alkali metal and ammonium persulfates and peroxydiphosphates, c. maintaining on said dispersion a pressure of ethylene in the range of from about 50 – 300 psi, and d. causing said free-radical donor to initiate interpolymerization while simultaneously adding to said dispersion 100 parts of vinyl acetate (VAc) monomer and about 0.5 to 2 parts of N-methylolacrylamide (NMA) in substantially constant NMA/VAc weight ratio, at a rate sufficient to cause interpolymerization of the vinyl, ethylene and N-methylolacrylamide but insufficient to permit the quantity of unpolymerized vinyl acetate in the aqueous composition to rise higher than about 3.5 percent by weight of the composition during the preparation of at least 75 percent of said interpolymerization.

2. The method of claim 1 wherein the unpolymerized vinyl acetate is maintained at below about 1 percent by weight of the aqueous composition during the preparation of at least 75 percent of said interpolymerization.

3. The method of claim 1 wherein the polyvinyl alcohol is hydrolyzed to the extent of between about 80 and 92 percent.

4. The method of claim 1 wherein the free-radical donor is caused to initiate interpolymerization thermally by maintaining the temperature between about 60° and 70°C.

5. The method of claim 1 wherein the free-radical donor is caused to initiate the interpolymerization by the gradual addition of a reducing agent.

* * * * *

UNITED STATES PATENT OFFICE
CERTIFICATE OF CORRECTION

Patent No. 3,714,105     Dated January 30, 1973

Inventor(s) Peter Fallon Stehle et al.

It is certified that error appears in the above-identified patent and that said Letters Patent are hereby corrected as shown below:

Column 6, line 35, the "-" should be -- + -- .

Signed and sealed this 29th day of May 1973.

(SEAL)
Attest:

EDWARD M. FLETCHER, JR.
Attesting Officer

ROBERT GOTTSCHALK
Commissioner of Patents